United States Patent [19]

Knepper

[11] Patent Number: 4,707,972
[45] Date of Patent: Nov. 24, 1987

[54] MOVABLE FEEDER FLOOR FOR COMBINES

[75] Inventor: Larimer J. Knepper, New Holland, Pa.

[73] Assignee: New Holland Inc., New Holland, Pa.

[21] Appl. No.: 746,606

[22] Filed: Jun. 19, 1985

[51] Int. Cl.$^4$ ............................................. A01F 12/10
[52] U.S. Cl. .............................. 56/10.2; 56/DIG. 15; 130/27 R
[58] Field of Search ...................... 56/10.2, 14.6, 14.5, 56/DIG. 15; 130/27 R, 27 JT, 27 S

[56] References Cited

U.S. PATENT DOCUMENTS

| | | | |
|---|---|---|---|
| 3,943,939 | 3/1976 | Rowland-Hill | 130/275 |
| 4,266,392 | 5/1981 | Knepper et al. | 56/14.5 |
| 4,294,062 | 10/1981 | Seymour | 56/10.2 |

Primary Examiner—Stephen C. Pellegrino
Attorney, Agent, or Firm—Larry W. Miller; Frank A. Seemar; Darrell F. Marquette

[57] ABSTRACT

A feederhouse interconnecting a combine base unit and a crop harvesting header to convey gathered crop material to the threshing and separating mechanism mounted in the base unit is disclosed wherein the face plate used to mount the crop harvesting header and movable relative to the feederhouse to change the cutting angle of the header is provided with a movable floor extension member engaged with the feederhouse floor to accommodate movement of the face plate relative to the feeder house. The floor extension member is pivotally mounted within a U-shaped bracket on the face plate and extends rearwardly therefrom to engage with an inclined surface formed in the feederhouse floor. A guide extending beneath the inclined surface of the feederhouse floor prevents the floor extension member from being disengaged from the feederhouse floor and, thereby, permitting a loss of crop material therebetween. An electronic stone detector version of the floor extension member provides for acoustical padding between the floor extension member and the U-shaped bracket and the inclined surface of the feederhouse floor to prevent metal to metal contact therebetween. An oblique portion having an electronic sensing device associated therewith is formed in the floor extension member to contact non-frangible objects within the flow of crop material through the feeder house.

10 Claims, 4 Drawing Figures

MOVABLE FEEDER FLOOR FOR COMBINES

BACKGROUND OF THE INVENTION

The present invention relates generally to combine harvesters and, more particularly, to an improved feederhouse construction to facilitate adjustments of the front face plate member to change the cutting angle of the attached crop harvesting header.

Combine harvesters are typically provided with a feederhouse to mount a forwardly extending crop harvesting header and to convey the crop material gathered thereby to the base unit of a combine for processing. In feederhouse structures of the type shown in U.S. Pat. No. 4,266,392, issued to Larimer J. Knepper, et al on May 12, 1981, the feederhouse is provided with a face plate on which the crop harvesting header is mounted. The face plate is movable in a fore-and-aft direction to change the cutting angle of the header.

This feederhouse configuration requires the operator to crawl underneath the feederhouse to loosen and subsequently tighten hardware to move the feederhouse floor to accommodate adjustments in the face plate to change the cutting angle of the header. If extreme care is not used when moving the face plate under these conditions, the floor member is susceptible to dropping out of position relative to the remaining feederhouse floor. As a result, problems of grain leakage from the feederhouse and/or of a feeding restriction through the feederhouse could occur with this structure. Accordingly, it would be desirable to provide a feederhouse floor that would be movable in response to adjustments of the face plate while maintaining a sealing engagement with the feederhouse floor to prevent loss of grain therebetween.

SUMMARY OF THE INVENTION

It is an object of this invention to overcome the aforementioned disadvantages of the prior art by providing a movable floor extension member pivotally connected to the face plate and sealingly engaged with the feederhouse floor.

It is another object of this invention to provide a floor extension member that is pivotally connected to the face plate so as to be movable therewith.

It is an advantage of this invention that the operator does not have to separately adjust the feederhouse floor when making adjustments in the face plate to change the cutting angle of the crop harvesting header.

It is a feature of this invention that the floor extension member is contained in a positive position to permit a superior sealing thereof against the feederhouse floor to prevent grain loss from the crop material flowing there the feederhouse.

It is another advantage of this invention that the distance between the floor of the feederhouse and the front drum changes very little when the face plate is adjusted.

It is still another object of this invention to provide a guide to keep the floor extension member in a sealing engagement with the feederhouse floor.

It is another feature of this invention that the floor extension member is free to pivot within the U-shaped bracket retaining the floor extension member in connection with the face plate so that the floor extension member can accommodate positional changes between the face plate and the feederhouse floorcaused by a movement of the face plate.

It is still another feature of this invention that the floor extension member includes a portion extending obliquely to the flow of crop material through the feederhouse to permit the mounting of an electronic sensing device to detect the impact of non-frangible objects within the flow of crop material.

It is yet another advantage of this invention that the floor extension member can be accoustically isolated from the feederhouse floor and the face plate by rubber pads.

It is a further object of this invention to provide a feederhouse floor extension member which is durable in construction, inexpensive of manufacture, carefree of maintenance, facile in assemblage and simple and effective in use.

These and other objects, features and advantages are accomplished according to the instant invention by providing a feederhouse interconnecting a combine base unit and a crop harvesting header to convey gathered crop material to the threshing and separating mechanism mounted in the base unit wherein the face plate used to mount the crop harvesting header and movable relative to the feederhouse to change the cutting angle of the header is provided with a movable floor extension member engaged with the feederhouse floor to accommodate movement of the face plate relative to the feeder house. The floor extension member is pivotally mounted within a U-shaped bracket on the face plate and extends rearwardly therefrom to engage with an inclined surface formed in the feederhouse floor. A guide extending beneath the inclined surface of the feederhouse floor prevents the floor extension member from being disengaged from the feederhouse floor and, thereby, permitting a loss of crop material therebetween. An electronic stone detector version of the floor extension member provides for acoustical padding between the floor extension member and the U-shaped bracket and the inclined surface of the feederhouse floor to prevent metal to metal contact therebetween. An oblique portion having an electronic sensing device associated therewith is formed in the floor extension member to contact non-frangible objects within the flow of crop material through the feeder house.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
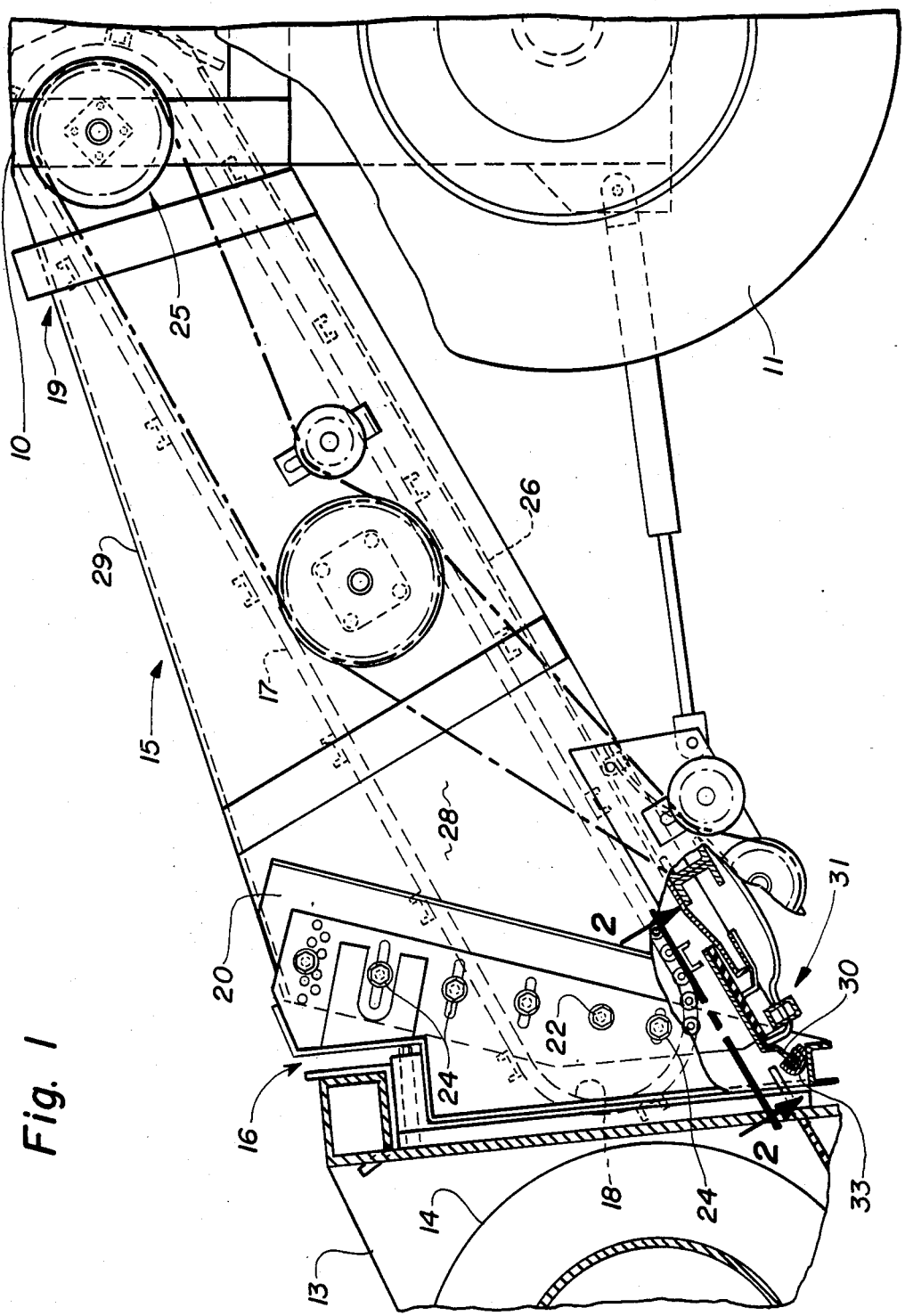
FIG. 1 is a side elevational view of a feederhouse interconnecting the combine base unit and the crop harvesting header and incorporating the principles of the instant invention, the base unit and header being fragmentarily shown.

Referring now to the drawings and, particularly, to FIG. 1, a side elevational view of a feederhouse 15 attached to a crop harvesting machine, commonly referred to as a combine 10, can be seen. Any left and right references are used as a matter of convenience and are determined by standing at the rear of the machine, facing the forward end, the direction of travel. The combine base unit 10 is mobilely supported by a wheeled frame 11 for movement over the field to harvest crop material. Pivotally mounted to the front of the base unit 10 is a feederhouse 15 on which is mounted a crop harvesting header 13. The combine base unit 10 and the header 13 are conventional construction and are only fragmentarily shown in FIG. 1. In general, the crop harvesting header 13 gathers crop material from the field and consolidates it by an auger 14 which discharges the crop material into the inlet end 16 of the feederhouse 15 where the crop material is engaged by a crop elevator 17 of conventional construction and conveyed to the discharge end 19 of the feederhouse 15 and fed into a conventional threshing and separating mechanism (not shown) supported in the base unit 10.

A face plate 20 is movably mounted on the inlet end of the feederhouse 15 to facilitate connection of the header 13 in flow communication with the feederhouse 15. The face plate 20 is pivotally movable in a fore-and-aft direction about a pivot axis 22. A plurality of fasteners 24 rigidly fix the front face member 20 into one of a plurality of selected position relative to the feederhouse 15. The front face member 20 is adjustable in this manner to provide adjustment of the cutting angle of the crop harvesting header 13 as described in greater detail in U.S. Pat. No. 4,266,392, issued to Larimer J. Knepper et al on May 12, 1981, the description thereof is incorporated herein by reference.

As one skilled in the art will readily realize the feederhouse 15 serves as a hollow conduit having a floor 26, upright walls 28 and a top 29 within which the crop elevator 17 is rotatably operable. The crop elevator 17 is preferably an endless chain and slat type which is rotatable about a front drum 18 and rotatably driven from the base unit 10 by a drive mechanism 25. The conveying of crop material from the inlet end 16 of the feederhouse 15 to its discharge end 19 is accomplished by the crop elevator 17 cooperating with the feederhouse floor 26.

Figure 2:
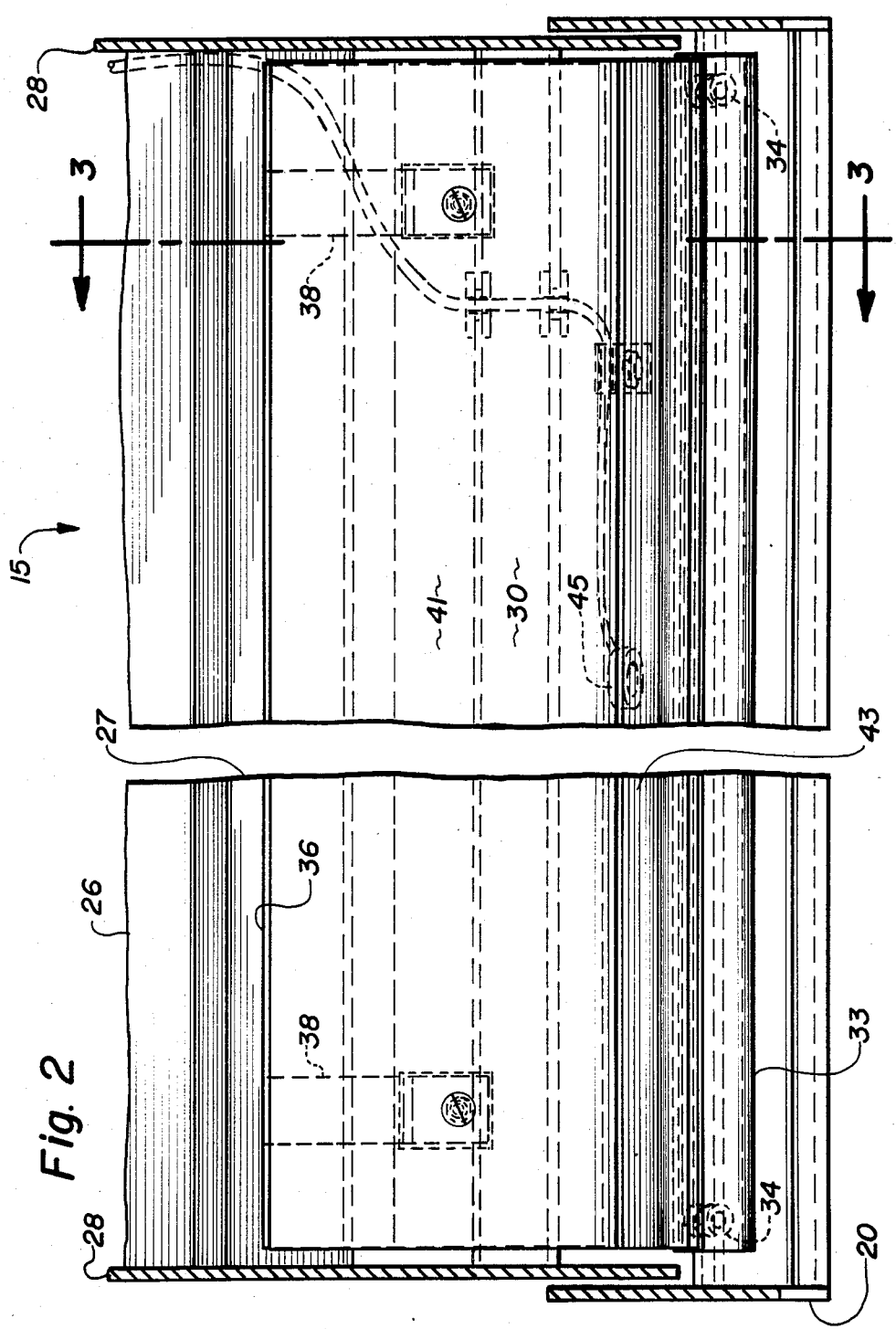
FIG. 2 is an enlarged cross sectional view of a portion of the feederhouse taken along lines 2—2 of FIG. 1 to show the floor extension member, portions of the feederhouse being broken away for purposes of clarity.
Figure 3:
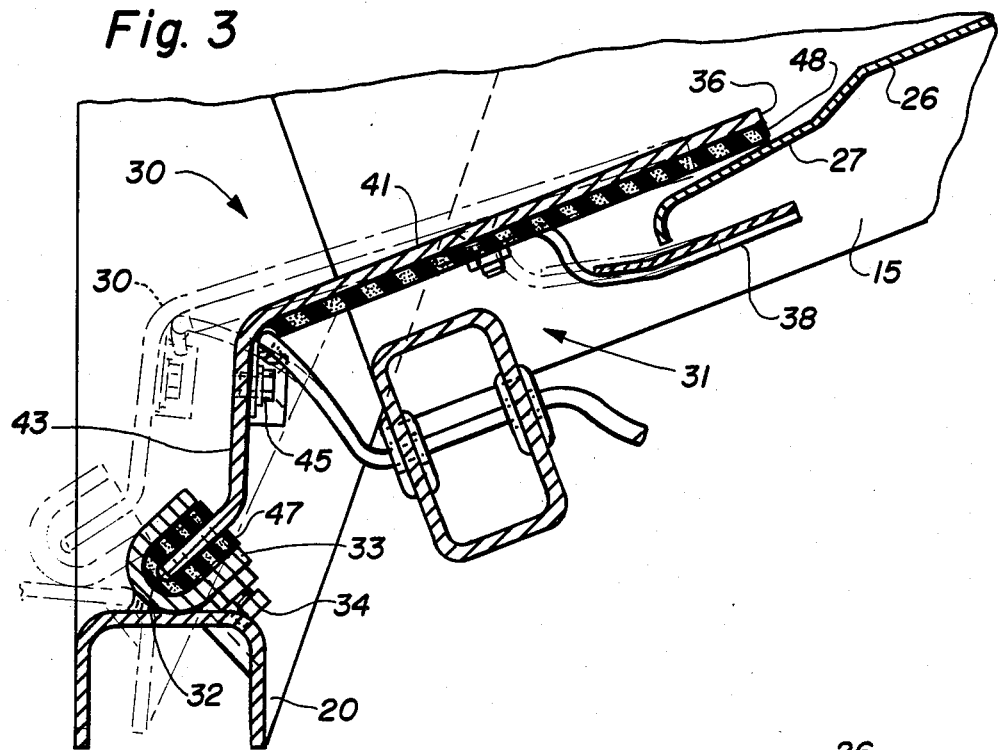
FIG. 3 is an enlarged cross sectional view through the floor extension member taken along lines 3—3 of FIG. 2 to show the electronic stone detector embodiment of the instant invention.
Figure 4:
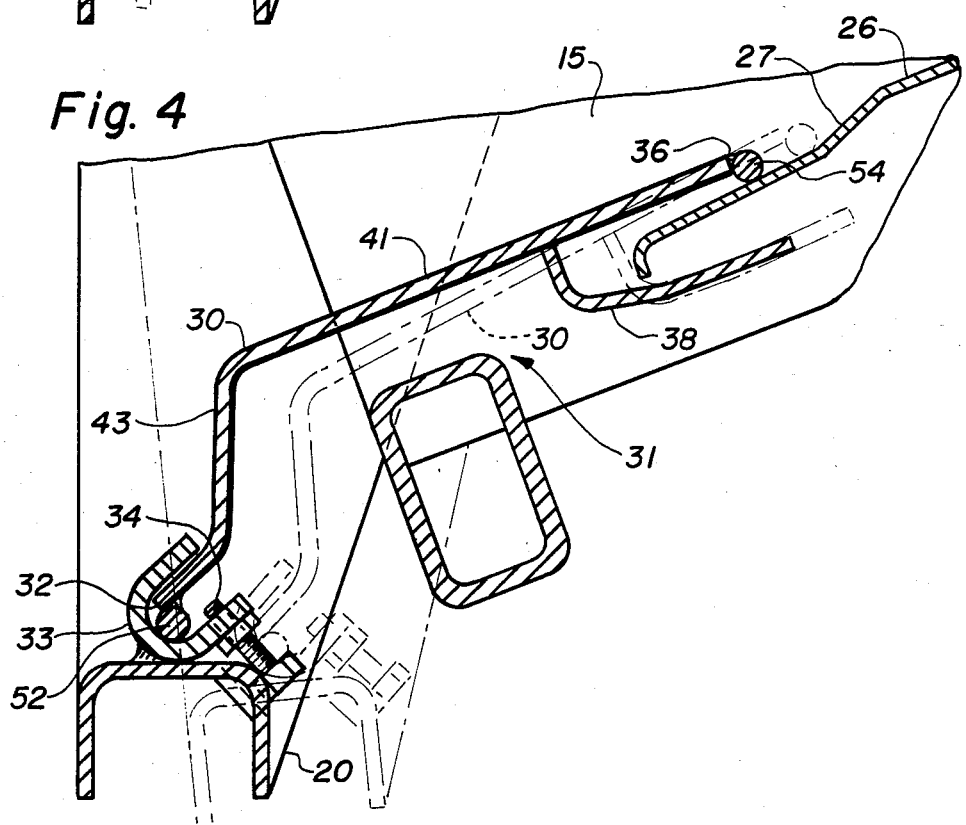
FIG. 4 is an enlarged cross-sectional view corresponding to the view of FIG. 3 but showing an alternative embodiment of the floor extension member not utilizing an electronic stone detecting device and acoustical padding.

Referring now to FIGS. 1, 2 and 3, the electronic stone detecting version of the floor extension member 30 spanning the gap 31 between the feederhouse floor 26 and the front face 20 can best be seen. The forward edge 32 of the floor extension member 30 is pivotally received within a U-shaped bracket 33 affixed to the front face member 20. A set screw 34 isolated from the member 30 by a rubber grommet and threadably engaged with the U-shaped bracket retains the forward edge 32 of the floor extension member 30 within the bracket 33, yet permits a pivotal movement therebetween. The rearward edge 36 of the floor extension member 30 is slidably engaged with an inclined surface 27 forming the forward edge of the feederhouse floor 26. A guide member 38, which may be bolted onto the planar portion 41 of the floor extension member 30 as shown in FIG. 3 or welded thereto as shown in FIG. 4, extends beneath the inclined surface 27 of the feederhouse floor 26 to facilitate a retention of the sealing engagement between the rearward edge 36 of the floor extension member 30 and the inclined surface 27. Alternatively, the floor extension member 30 could be biased toward a sealing engagement with the inclined surface 27 by a strap or springs.

The floor extension member is formed with a generally planar surface 41 which serves as an extension of the feeder house floor 26 and, therefore, is cooperable with the crop elevator 17 to affect a conveyance of crop material through the feederhouse 15. It can be seen from a comparison of the movements of the floor extension member 30 shown in phantom in FIGS. 3 and 4 that an adjustment of the face plate 20 to change the cutting angle of the header 13 does not significantly change the distance between the floor extension member 30 and the front drum 18 of the crop elevator 17 such that the conveying performance of the crop elevator 17 is not significantly affected.

The front face member 30 is also provided with an oblique portion 43 which engages the flow of crop material through the feederhouse 15 such that a non-frangible object within the crop material flow would impact the oblique portion 43 and cause a vibration therein. An electronic sensing device 45 is mounted on the oblique portion 43 to sense these vibrations induced in the oblique portion 43 by a non-frangible object within the flow of crop material through the feederhouse 15. The operation of this electronic sensing device 45 is described in better detail in U.S. Pat. No. 4,294,062, issued to Shaun A. Seymour on Oct. 13, 1981, the description of which is incorporated herein by reference. The floor extension member 30 is accoustically isolated from the U-shaped bracket 33 and the feederhouse floor 26 by rubber pads 47,48 preventing any metal-to-metal contact that might induce false vibrations to be picked up by the electronic sensing device 45.

Referring now to FIG. 4, an alternative embodiment of the floor extension member 30 which does not incorporate an electronic sensing device 45 can be seen. As noted with the embodiment shown in FIG. 3, the floor extension member 30 is pivotally engaged with the U-shaped bracket 33 and slidably engaged with the inclined surface 27 of the feederhouse floor 26. A guide member 38 extends below the inclined surface 27 to keep the rearward edge 36 of the floor extension member 30 in sealing engagement with the inclined surface 27. A set screw 34 threadably engaged with the U-shaped bracket 33 keeps the forward edge 32 of the floor extension member retained within the bracket 33. To facilitate the pivoting movement of the floor extension member within the bracket 33, the forward edge 36 is provided with a circular portion 52, which can be in the form of a rod welded to the forward edge 32 or a rolled edge formed in the forward edge 32 of the floor extension member 30. Likewise, the rearward edge 36 of the floor extension member 30 is provided with a circular edge 54 to facilitate the sliding movement along the inclined surface 27 of the feederhouse floor 26 and to facilitate a sealing engagement therewith.

In operation, an adjustment of the face plate 20 to change the angle of the header 13 with respect to the feederhouse 15 and/or the ground causes a movement of the floor extension member 30 to correspond therewith. The extent of movement from a medial position corresponding with the fore-and-aft movement of the face plate 20 can be seen in the phantom lines of FIGS. 3 and 4. The rubber pad 47 in the embodiment of FIG.

3 and the rolled edge 52 in the embodiment of FIG. 4 permit a pivotal movement of the forward edge 32 of the floor extension member relative to the U-shaped bracket 33 to accommodate positional changes. The guide member 38 retains the rubber pad 48 in the embodiment of FIG. 3 or the rolled edge 54 in the embodiment of FIG. 4 at the rearward edge 36 of the floor extension member 30 in a sealing engagement with the inclined surface 27 of the feederhouse floor 26. The set screw 34 and the spatial relationship between the rearward edge 36 and the guide member 38 with the inclined surface 27 of the feederhouse 26 prevents the floor extension member from becoming disengaged with either the face plate 20 or the feederhouse floor 26, thereby retaining integrity of the feederhouse floor and preventing the loss of crop material from the feederhouse 15.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form shown.

Having thus described the invention, what is claimed is:

1. In a combine harvester having a base unit supported by a mobile frame; a feederhouse supported from said mobile frame and having a forwardly spaced inlet end and a discharge end in flow communication with said base unit to feed crop material thereto for harvesting treatment, said feederhouse being formed as a hollow conduit with a floor and upright walls, said feederhouse having a crop elevator mounted therewithin to be cooperable with said floor to convey crop material from said inlet end to said discharge end; and a face plate movably mounted on the inlet end of said feederhouse for a detachable connection to a crop gathering header, said face plate being movable in a fore-and-aft direction to change the angle of the crop gathering header relative to the ground, the improvement comprising:

a floor extension member pivotally connected to said face plate at a position adjacent said crop harvesting header and extending rearwardly therefrom to said feederhouse floor for a slidable engagement therewith in a telescopic manner, said floor extension member being movable in said fore-and-aft direction with said face plate and being operable upon movement of said face plate to span the variable distance between said crop harvesting header and said feederhouse floor.

2. The combine harvester of claim 1 wherein said floor of said feederhouse is provided with an inclined surface adjacent said floor extension member, said floor extension member being sealingly engaged with said inclined surface to prevent the loss of crop material therebetween.

3. The combine harvester of claim 2 wherein said face plate includes a U-shaped bracket affixed thereto, said floor extension member being pivotally supported within said bracket and prevented from disengagement therewith by a set screw threadably received within said bracket.

4. The combine harvester of claim 3 wherein the floor extension member is provided with a guide engageable with said inclined surface to prevent said floor extension member from becoming disengaged with said feederhouse floor and permitting a loss of crop material therebetween.

5. The combine harvester of claim 4 wherein said guide extends beneath said inclined surface.

6. The combine harvester of claim 4 wherein said floor extension member includes a portion extending oblique to the path of crop material flow through the feederhouse.

7. The combine harvester of claim 6 wherein the oblique portion of said floor extension member is provided with sensing means to detect vibrations induced therein by non-frangible objects within the flow of crop material striking said oblique portion.

8. The combine harvester of claim 7 wherein said floor extension member is acoustically isolated from said face plate and said feederhouse floor by acoustic pads disposed between said floor extension member and said U-shaped bracket and between said floor extension member and said inclined surface of said feederhouse floor to prevent any metal-to-metal contact therebetween.

9. The combine harvester of claim 8 wherein the acoustical pad between said floor extension member and said U-shaped bracket permits a pivotal movement of said floor extension member within said U-shaped bracket.

10. The combine harvester of claim 4 wherein the edge of said floor extension member engaged with said U-shaped bracket and the edge of said floor extension member engaged with said inclined surface are provided with a circular portion to facilitate the respective movement between said floor extension member and said U-shaped bracket and said inclined surface to maintain a sealing relation therebetween.

* * * * *